H. F. WATERS.
ELECTRIC POWER PLANT.
APPLICATION FILED SEPT. 24, 1913.
1,125,783.
Patented Jan. 19, 1915.
2 SHEETS—SHEET 1.
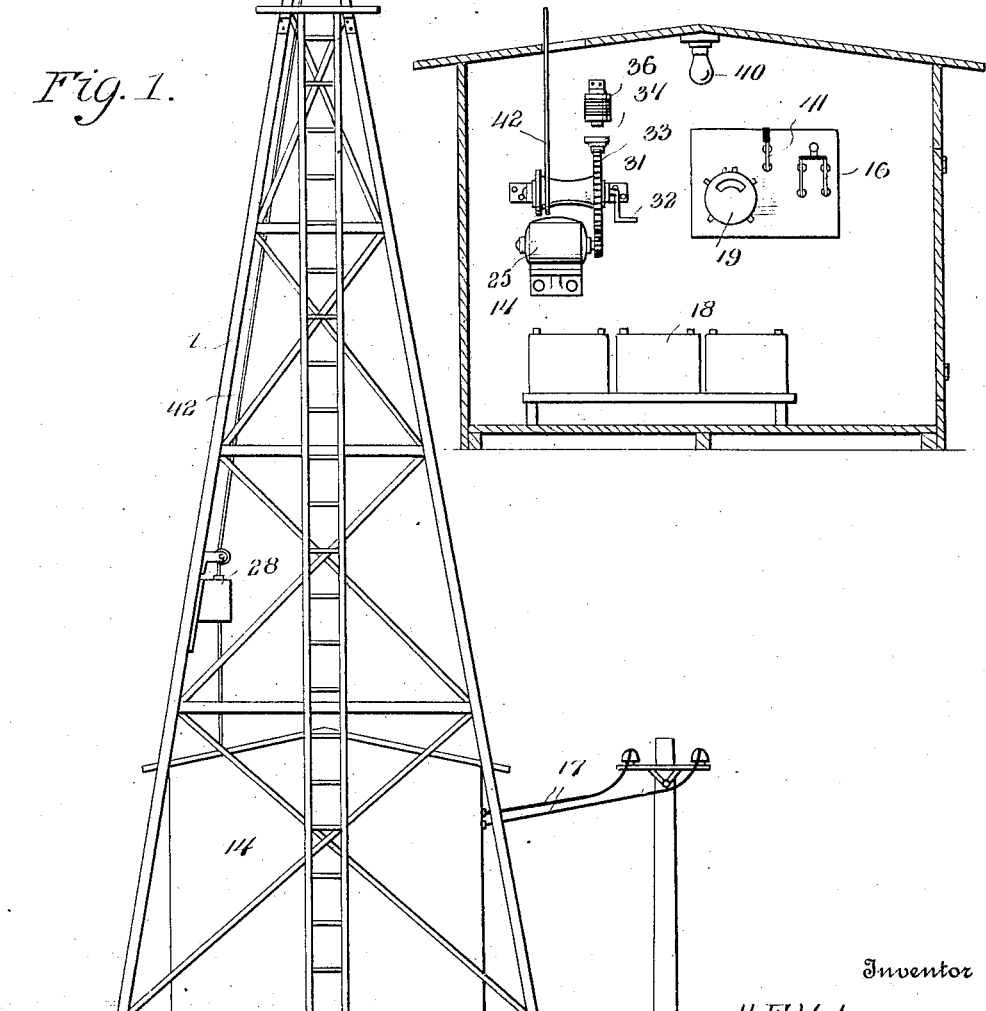

H. F. WATERS.
ELECTRIC POWER PLANT.
APPLICATION FILED SEPT. 24, 1913.
1,125,783.
Patented Jan. 19, 1915.
2 SHEETS—SHEET 2.
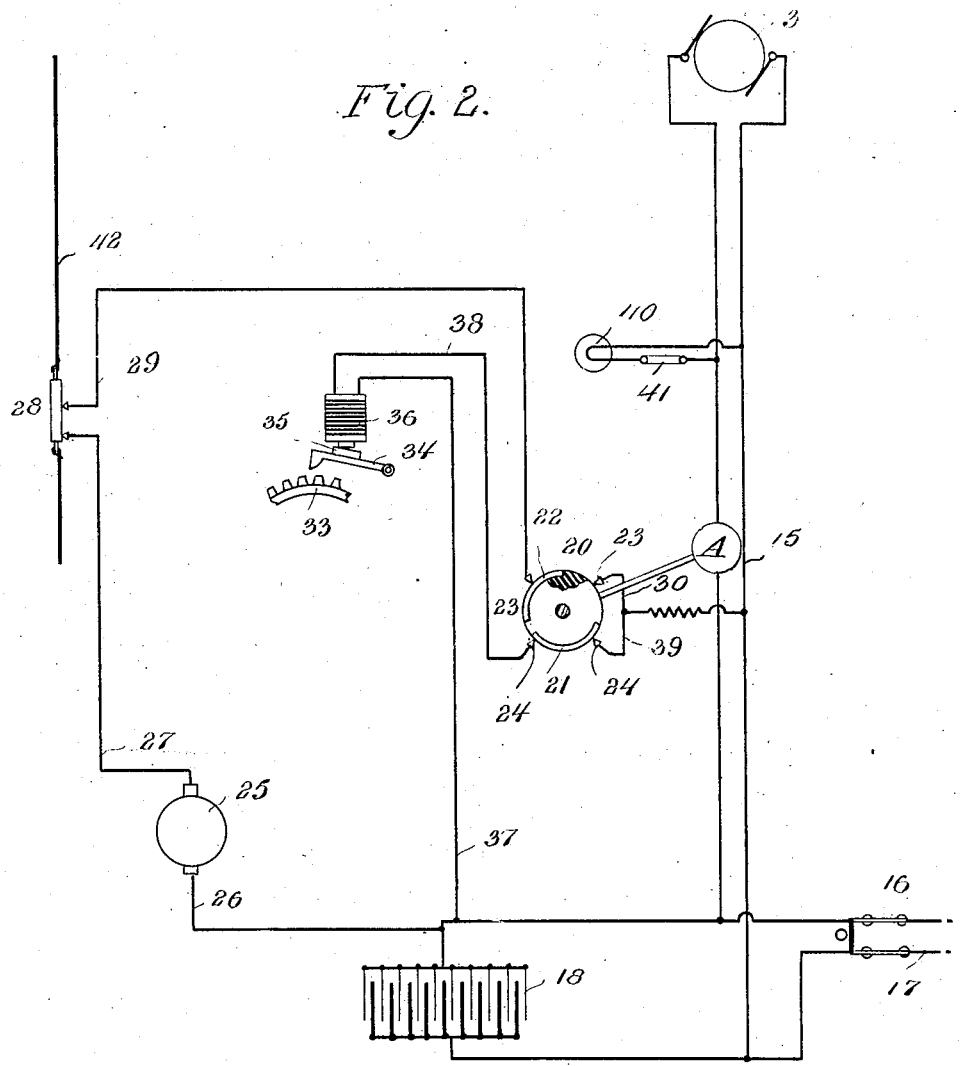
Witnesses
W. R. Smith
John J. McCarthy
Inventor
H. F. Waters.
By Victor J. Evans
Attorney

UNITED STATES PATENT OFFICE.

HARRY F. WATERS, OF COLORADO SPRINGS, COLORADO.

ELECTRIC POWER PLANT.

1,125,783.   Specification of Letters Patent.   Patented Jan. 19, 1915.

Application filed September 24, 1913. Serial No. 791,619.

*To all whom it may concern:*

Be it known that I, HARRY F. WATERS, a citizen of the United States, residing at Colorado Springs, in the county of El Paso and State of Colorado, have invented new and useful Improvements in Electric Power Plants, of which the following is a specification.

This invention relates to improvements in electric current generating plants and, in the present instance, has particular application to a wind operated plant.

In carrying out the present invention, it is my purpose to provide an electric current generating plant which will be found especially useful in charging storage batteries and wherein the driving mechanism of the charging generator will be automatically cut out of service when the current in the charging circuit rises above a predetermined point, thereby preventing injury to the battery.

It is also my purpose to provide a wind operated electric power plant wherein the wind wheel driving the generator will be automatically thrown out of the wind in the event of the current from the generator exceeding a predetermined value, incident to the too rapid rotation of the wind wheel and wherein the wind wheel will be thrown into the wind when the current strength of the charging circuit has dropped below a predetermined point.

With the above and other objects in view, the invention consists in the construction, combination and arrangement of parts hereinafter set forth in and falling within the scope of the claims.

In the accompanying drawings, Figure 1 is a view in elevation of a wind operated electric current generating plant constructed in accordance with my present invention. Fig. 2 is a diagrammatic view showing the various circuit connections. Fig. 3 is a vertical sectional view through the housing. Fig. 4 is a top plan view of the tail vane showing the connections between the latter and the generator casing.

Referring now to the accompanying drawings in detail, the numeral 1 designates a wind mill tower of any desired construction, while 2 indicates a turn table secured to the upper end of the tower. Mounted upon the turn table 2 and capable of rotation in a horizontal plane is an electric current generator or dynamo electric machine 3. Fast upon one end of the armature shaft of the generator 3 is a wind wheel 4 of any suitable construction and provided, concentrically of the armature shaft and upon the rear face thereof with a hub 5 encircled by a brake band 6 having one end fastened to a bracket arm 7 secured to the casing of the generator 3 and the opposite end connected with one extremity of a brake lever 8 fulcrumed between its ends upon a pivot pin 9 carried by the generator casing. Loosely surrounding the opposite end of the armature shaft of the generator and fastened to or formed integral with the generator casing is a collar 10 to which is pivotally connected at diametrically opposite points the outer ends of the opposite limbs of a yoke 11 carrying a tail vane 12. Contractile springs 13, 13 each have one end fastened to one side of the tail vane 12 and the opposite end secured to the collar 10, such springs acting to hold the tail vane in a position coaxial with the axis of the wind wheel.

Built in the base of the tower 1 is a shed or like structure 14 and leading into such shed from the generator 3 are electric current carrying mains 15 terminating, in the shed, in a double pole double throw switch 16 by means of which the mains may be connected up with line wires 17. Also arranged within the shed or housing 14 is a storage battery 18 connected in circuit with the mains 15 and adapted to be charged from the generator. Connected in the charging circuit composed of the mains 15 is an ammeter 19 connected up with a controller. In the present instance, this controller comprises a disk 20 of insulating material fast upon one end of the shaft of the ammeter and provided upon its periphery at diametrically opposite points with metallic segments 21, 22, and contacts 23, 23 adapted to be bridged by the segment 22 and contacts 24, 24 adapted to be bridged by the segment 21, the segment 22 being in non-bridging position when the segment 21 is bridging the contacts 24, 24 and vice versa. An electric motor 25 is connected in parallel with the mains 15 by way of a wire 26 establishing communication between one of the mains and one side of the motor, a wire 27 connected to one side of a switch 28, a wire 29 leading from the opposite side of the switch to one of the contacts 23, and a wire 30 leading from the remaining contact 23 to the other main. Connected through suitable gearing with the motor 25 is a windlass 31 equipped with a crank handle 32 by means of which the windlass may be operated manually in the event of defect in the motor or the circuit thereof. Coöperating with the teeth of the gear wheel on the shaft of the winding drum of the windlass 31 is a dog 34 designed to prevent retrograde movement of the windlass 31. This dog 34 is carried by one end of an armature 35 pivoted at its opposite end and disposed within the influence of the poles of electromagnet 36 connected in parallel with the mains 15 by way of a wire 37 establishing communication between one of the mains and one side of the magnet, a wire 38 leading from the opposite terminal of the magnet to one of the contact points 24, and a wire 39 connected with the remaining contact 24 and connected with the other main 15 by way of a portion of the wire 30.

An electric lamp 40 is connected in multiple with the mains and controlled by a switch 41 so that the shed or housing 14 may be illuminated when desired. The switch 28 is connected with a cable 42 having one end thereof passed through an eye 43 on the tail vane 12 and secured to the free terminal of the brake lever 7 and the opposite end thereof connected to and adapted to be wound about the drum of the windlass 31.

The operation of my electric current generating plant may be briefly stated as follows: Assuming the wind wheel 4 to be in the wind and rotating, the generator 3 will be operated so that current flows through the mains 15 to the storage battery 18 to charge the latter and from the mains to the external circuit, the line wires 17, the switch 16 being closed, of course. The current passing to the storage battery flows through the ammeter 19 and should such current exceed an amperage dangerous to the life of the battery, incident to the too rapid rotation of the wind wheel, the disk 20 of the controller will be rotated under the action of the ammeter shaft to bridge the contacts 23, 23 by the segment 22 whereby current will flow from one of the mains 15 through the wire 26, motor 25, wire 27, switch 28, the latter being closed, wire 29, contact 23, segment 22, the remaining contact 23, and the wire 30 back to the other main. As the motor operates, the drum of the windlass 31 is rotated with the effect to wind up the cable 42 and so operate the brake lever 7 to check the rotation of the wind wheel and swing the tail vane 12 so that the wind wheel will be thrown out of the wind. Simultaneously with the operation of the brake lever and the throwing of the wind wheel out of the wind, the switch 28 is operated, incident to the connection between the same and the cable, to break the circuit through the motor 25 thereby deënergizing the latter. When the current flowing through the charging circuit from the generator falls below the normal strength, the ammeter rotates the disk 20 of the controller to break the circuit through the contacts 23 and bridge the contacts 24, 24 by the segment 21 whereby current flows from the storage battery through the wire 37, magnets 36, contact 24, segment 21, the other contact 24, the wire 39, the respective portion of the wire 30, and one of the mains 15 back to the other side of the storage battery. Upon the energization of the magnets 36, the armature 35 is operated to withdraw the dog 34 from engagement with the teeth of the gear wheel thereby permitting the drum of the windlass to unwind and so relieve the tension of the cable 42 whereby the brake will be released and the wind wheel thrown back into the wind.

While I have herein shown and described one preferred form of my invention by way of illustration, I wish it to be understood that I do not limit or confine myself to the precise details of construction herein described and delineated, as modification and variation may be made within the scope of the claims without departing from the spirit of the invention.

I claim:

1. In an electric power plant, a generator, means for driving the same, a storage battery in circuit with said generator and adapted to be charged therefrom, an ammeter in circuit with the generator, a motor connected in circuit with the generator, means whereby said motor may render the driving means inoperative, and a controller connected with said ammeter and adapted to close the circuit to said motor upon an abnormal increase in current from the generator whereby said driving means will be rendered inactive.

2. In an electric power plant, a generator, means for driving the same, a storage battery in circuit with said generator and adapted to be charged therefrom, an ammeter in circuit with the generator, a motor connected in circuit with the generator, means whereby said motor may render the driving means inactive, a controller connected with said ammeter and adapted to close the circuit to said motor upon an abnormal increase in current from the generator whereby said driving means will be rendered inactive, and means connected with said last means and adapted to break the circuit through the motor upon the driving means being rendered inactive.

3. In an electric power plant, a generator, means for driving the same, a storage battery in circuit with said generator and adapted to be charged therefrom, an ammeter in circuit with the generator, a motor connected in circuit with said generator, means whereby said motor may render said driving means inactive, means for holding said last means in operated position, and a controller connected with said ammeter and adapted to close the circuit to said motor upon an abnormal increase in current from the generator whereby said driving means will be rendered inactive.

4. In an electric power plant, a generator, means for driving the same, a storage battery in circuit with said generator and adapted to be charged therefrom, an ammeter in circuit with the generator, a motor connected in circuit with said generator, means whereby said motor may render said driving means inactive, means for holding said last means in operated position, and a controller connected with said ammeter and adapted to close the circuit to said motor upon an abnormal increase in current from the generator whereby said driving means will be rendered inactive, and close the circuit to said last-named means upon the current falling below normal whereby said second-named means will be released.

5. In an electric power plant, a generator, a wind wheel for driving the same, a storage battery in circuit with said generator and adapted to be charged therefrom, a current controlled device in the charging circuit, a motor connected in circuit with said generator, connections between said motor and wind wheel, and a controller connected with said current controlled device and adapted to close the circuit to said motor upon an abnormal increase in current in the charging circuit whereby said wind wheel will be rendered inactive.

6. In an electric power plant, a generator, a wind wheel for driving the same, a storage battery in circuit with said generator and adapted to be charged therefrom, a current controlled device in the charging circuit, a motor connected in circuit with the generator, means operable from said motor to throw the wind wheel out of the wind, and a controller connected with said current controlled device and adapted to close the circuit to said motor upon an abnormal increase in current whereby the wind wheel will be thrown out of the wind.

7. In an electric power plant, a generator, a wind wheel for driving the same, a storage battery in circuit with said generator and adapted to be charged therefrom, a current controlled device in the charging circuit, a motor connected in circuit with the generator, means operable from said motor to throw the wind wheel out of the wind, a controller connected with said current controlled device and adapted to close the circuit to said motor upon an abnormal increase in current whereby the wind wheel will be thrown out of the wind, and a brake for said wind wheel operable from said second-named means.

8. In an electric power plant, a generator, a wind wheel for driving the same, a storage battery in circuit with said generator and adapted to be charged therefrom, a current controlled device in the charging circuit, a motor connected in circuit with the generator, means operable from said motor to throw the wind wheel out of the wind, a controller connected with said current controlled device and adapted to close the circuit to said motor upon an abnormal increase in current whereby the wind wheel will be thrown out of the wind, and a switch operable from said second-named means to break the motor circuit upon the wind wheel being thrown out of the wind.

9. In an electric power plant, a generator, a wind wheel for driving the same, a storage battery in circuit with the generator and adapted to be charged therefrom, a current controlled device in the charging circuit, a motor in circuit with the generator, a windlass geared up to said motor, a cable connecting said windlass and wind wheel whereby the latter may be thrown out of the wind, and a controller connected with said current controlled device and adapted to close the circuit to said motor upon an abnormal increase in current whereby said windlass may be operated and the wind wheel thrown out of the wind.

10. In an electric power plant, a generator, a wind wheel for driving the same, a storage battery in circuit with the generator and adapted to be charged therefrom, a current controlled device in the charging circuit, a motor in circuit with the generator, a windlass geared up to said motor, a cable connecting said windlass and wind wheel whereby the latter may be thrown out of the wind, a controller connected with said current controlled device and adapted to close the circuit to said motor upon an abnormal increase in current whereby said windlass may be operated and the wind wheel thrown out of the wind, a switch operable from said cable to break the motor circuit succeeding the operation of the windlass.

11. In an electric power plant, a generator, a wind wheel for driving the same, a storage battery in circuit with the generator and adapted to be charged therefrom, a current controlled device in the charging circuit, a motor in circuit with the generator, a windlass geared up to said motor, a cable connecting said windlass and wind wheel whereby the latter may be thrown out of the wind, a controller connected with said current controlled device and adapted to close the circuit to said motor upon an abnormal increase in current whereby said windlass may be operated and the wind wheel thrown out of the wind, a switch operable from said cable to break the motor circuit succeeding the operation of the windlass, and means for holding said windlass in operated position succeeding the breaking of the motor circuit.

12. In an electric power plant, a generator, a wind wheel for driving the same, a storage battery in circuit with the generator and adapted to be charged therefrom, a current controlled device in the charging circuit, a motor in circuit with the generator, a windlass geared up to said motor, a cable connecting said windlass and wind wheel whereby the latter may be thrown out of the wind, a controller connected with said current controlled device and adapted to close the circuit to said motor upon an abnormal increase in current whereby said windlass may be operated and the wind wheel thrown out of the wind, a switch operable from said cable to break the motor circuit succeeding the operation of the windlass, means for holding said windlass in operated position succeeding the breaking of the motor circuit, and means for releasing said locking means upon the current falling below normal.

13. In an electric power plant, a generator, means for driving the same, a storage battery in circuit with said generator and adapted to be charged therefrom, a current controlled device in circuit with the generator, a motor connected in circuit with the generator, means whereby said motor may render the driving means inactive, and a controller connected with said current controlled device and adapted to close the circuit to said motor upon an abnormal increase in current from the generator whereby said driving means will be rendered inactive.

14. In an electric power plant, a generator, means for driving the same, a storage battery in circuit with said generator and adapted to be charged therefrom, a current controlled device in circuit with the generator, a motor connected in circuit with the generator, means whereby said motor may render the driving means inactive, a controller connected with said current controlled device and adapted to close the circuit to said motor upon an abnormal increase in current from the generator whereby said driving means will be rendered inactive, and means operable to break the circuit of said motor upon the driving means being rendered inactive.

15. In an electric power plant, a generator, means for driving the same, a storage battery in circuit with said generator and adapted to be charged therefrom, a current controlled device in circuit with the generator, a motor connected in circuit with the generator, means whereby said motor may render the driving means inactive, a controller connected with said current controlled device and adapted to close the circuit to said motor upon an abnormal increase in current from the generator whereby said driving means will be rendered inactive, and motor operated means adapted to break the circuit through the motor upon the driving means being rendered inactive.

16. In an electric power plant, a generator, a wind wheel for driving the same, a tail vane controlling said wind wheel, a storage battery connected in circuit with said generator and adapted to be charged therefrom, a current controlled device in the charging circuit, a motor connected in circuit with said generator, connections between said motor and tail vane, and a controller connected with said current controlled device and adapted to close the circuit to said motor upon an abnormal increase in current in the charging circuit whereby said tail vane will be actuated to swing the wind wheel out of the wind.

17. In an electric power plant, a generator, a wind wheel for driving the same, a tail vane controlling said wind wheel, a storage battery in circuit with said generator and adapted to be charged therefrom, a current controlled device in the charging circuit, a motor connected in circuit with the generator, a windlass driven from said motor, a cable connecting said windlass and tail vane, and a controller connected with said current controlled device and adapted to close the circuit to said motor upon an abnormal increase in current in the charging circuit whereby the tail vane will be actuated to swing the wind wheel out of the wind.

18. In an electric power plant, a generator, a wind wheel for driving the same, a tail vane controlling said wind wheel, a storage battery in circuit with said generator and adapted to be charged therefrom, a current controlled device in the charging circuit, a motor connected in circuit with the generator, a windlass driven from said motor, a cable connecting said windlass and tail vane, a controller connected with said current controlled device and adapted to close the circuit to said motor upon an abnormal increase in current in the charging circuit whereby the tail vane will be actuated to swing the wind wheel out of the wind, and a switch operable from said cable to break the circuit of the motor succeeding the movement of the tail vane under the action of the motor.

19. In an electric power plant, a generator, a wind wheel for driving the same, a tail vane controlling said wind wheel, a storage battery in circuit with said generator and adapted to be charged therefrom, a current controlled device in the charging circuit, a motor connected in circuit with the generator, a windlass driven from said motor, a cable connecting said windlass and tail vane, a controller connected with said current controlled device and adapted to close the circuit to said motor upon an abnormal increase in current in the charging circuit whereby the tail vane will be actuated to swing the wind wheel out of the wind, and a brake for said wind wheel operable from said cable.

20. In an electric power plant, a generator, a wind wheel driving said generator, a storage battery in circuit with said generator and adapted to be charged therefrom, and means for throwing the wind wheel out of the wind upon an abnormal increase in current in the charging circuit.

21. In an electric power plant, a generator, a wind wheel connected to the armature shaft of said generator for driving the latter, a tail vane, a storage battery in circuit with said generator and adapted to be charged therefrom, a current controlled device in the charging circuit, a motor connected in circuit with said generator, connections between said motor and tail vane, and a controller connected with said current controlled device and adapted to close the circuit to said motor upon an abnormal increase in the current in the charging circuit whereby said tail vane will be actuated and the wind wheel swung out of the wind.

22. In an electric power plant, a generator, a wind wheel connected to the armature shaft of the generator for driving the latter, a tail vane, a storage battery in circuit with said generator and adapted to be charged therefrom, a current controlled device in the charging circuit, a motor connected in circuit with said generator, connections between said motor and tail vane, a controller connected with said current controlled device and adapted to close the circuit to said motor upon an abnormal increase in current in the charging circuit whereby said tail vane will be actuated and the wind wheel swung out of the wind, and a brake for said wind wheel operable from said motor.

23. In an electric power plant, a generator, a wind wheel for driving the same, a storage battery in circuit with said generator and adapted to be charged therefrom, a current controlled device in circuit with the generator, a motor connected in circuit with said generator, means whereby said motor may render said driving means inactive, means for holding said last means in operated position, and a controller connected to said current controlled device and adapted to close the circuit to said motor upon an abnormal increase in current from the generator whereby said wind wheel will be rendered inactive, and close the circuit to said last-named means upon the current falling below normal whereby the last-named means will be released.

24. In an electric power plant, the combination with a generator, of a wind wheel connected with said generator for driving the latter, a storage battery connected in circuit with said generator, and means for swinging the wind wheel out of the wind upon an abnormal increase in current in the charging circuit and permitting the wind wheel to reënter the wind upon the current in the charging circuit falling below a predetermined value.

25. In an electric power plant, the combination with a generator, of a wind wheel connected with said generator for driving the latter, a storage battery connected in circuit with said generator, means for swinging the wind wheel out of the wind upon an abnormal increase in current in the charging circuit and permitting the wind wheel to reënter the wind upon the current in the charging circuit falling below a predetermined value, and means for braking the wind wheel as the latter swings out of the wind.

26. In an electric power plant, the combination with a wind wheel, of a generator driven from said wind wheel, a supply circuit including said generator, and means for swinging the wind wheel out of the wind upon an abnormal increase in current in the supply circuit.

27. In an electric power plant, the combination with a wind wheel, of a generator driven from said wind wheel, a supply circuit including said generator, and means for swinging the wind wheel out of the wind upon an abnormal increase in current in the supply circuit and permitting the wind wheel to reënter the wind upon the current in the supply circuit falling below a predetermined value.

In testimony whereof I affix my signature in presence of two witnesses.

HARRY F. WATERS.

Witnesses:
  A. S. GILL,
  J. B. FLAHERTY.

Copies of this patent may be obtained for five cents each, by addressing the "Commissioner of Patents, Washington, D. C."